(12) United States Patent
Bedrosian

(10) Patent No.: US 6,574,245 B1
(45) Date of Patent: Jun. 3, 2003

(54) ENHANCED SYNCHRONIZATION STATUS MESSAGING

(75) Inventor: Paul Stephan Bedrosian, Andover, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/219,230

(22) Filed: Dec. 23, 1998

Related U.S. Application Data

(60) Provisional application No. 60/068,878, filed on Dec. 26, 1997.

(51) Int. Cl.$^7$ ................................................ H04J 3/06
(52) U.S. Cl. ...................................... 370/503; 375/356
(58) Field of Search ................................. 370/509–510, 370/512–513, 514, 516, 511, 522–523, 503, 507; 375/356, 362

(56) References Cited

U.S. PATENT DOCUMENTS

| | | | | |
|---|---|---|---|---|
| 5,867,484 A | * | 2/1999 | Shaunfield | 370/254 |
| 5,886,996 A | * | 3/1999 | Wolf | 370/507 |
| 6,014,414 A | * | 1/2000 | Yamamoto et al. | 375/356 |
| 6,078,595 A | * | 6/2000 | Jones et al. | 370/219 |
| 6,163,551 A | * | 12/2000 | Wolf | 370/503 |

\* cited by examiner

*Primary Examiner*—Melvin Marcelo
*Assistant Examiner*—Inder Pal Mehra

(74) *Attorney, Agent, or Firm*—Gregory J. Murgia

(57) ABSTRACT

An enhanced synchronization status messaging capability for synchronous networks is provided in a messaging format that is compatible with existing synchronization messaging standards. Additional messages, which are based on the same predefined code words used in existing synchronous status messages, are differentially coded and carried in available, but unused message positions, in the existing messaging scheme. In one illustrative embodiment, a two part message format is used for carrying information between network elements and between a network element and a co-located BITS clock in-a synchronous network. A first part of the message format carries the traditional quality level information of synchronization references using the set of code words predefined in the applicable standards. For example, the quality information of a synchronization reference is conveyed using 7 out of 10 "like" messages selected from the group of predefined code words set forth in the standards. The second part of the message format carries one or more enhanced messages that are conveyed using the same group of predefined code words, but which are differentially coded into message positions that are available and unused in the existing standards-compliant messaging schemes. For example, additional information can be conveyed in the remaining unused 3 out of 10 messages. By differentially coding the enhanced messages relative to the standard message part, the enhanced messages will always have separately identifiable code words even if the quality level designation of a reference conveyed by the 7 out of 10 "like" messages changes during a network reconfiguration.

40 Claims, 7 Drawing Sheets

FIG. 1

| DESCRIPTION | QUALITY LEVEL | ACRONYM | DS1 ESF DATA LINK CODE WORD | SONET OVERHEAD (S1 BITS 5-8) |
|---|---|---|---|---|
| PRS TRACEABLE | 1 | PRS | 00000100 11111111 | 0001 |
| SYNCHRONIZED-TRACEABILITY UNKNOWN | 2 | STU | 00001000 11111111 | 0000 |
| TRACEABLE STRATUM 2 (HOLDOVER) | 3 | ST2 | 00001100 11111111 | 0111 |
| TRACEABLE STRATUM 3 (HOLDOVER) | 4 | ST3 | 00010000 11111111 | 1010 |
| TRACEABLE SONET CLOCK (SELF-TIMED) | 5 | SIC | 00100010 11111111 | 1100 |
| TRACEABLE STRATUM 4 (FREE-RUN) | 6 | ST4 | 00101000 11111111 | N/A |
| DON'T USE FOR SYNCHRONIZATION | 7 | DUS | 00110000 11111111 | 1111 |
| RESERVED FOR NETWORK SYNCHRONIZATION USE | USER ASSIGNABLE | RES | 01000000 11111111 | 1110 |

FIG. 2

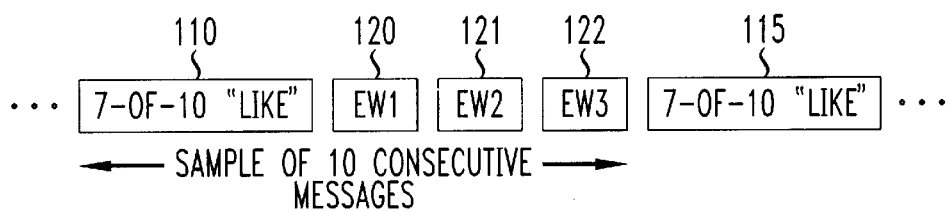

FIG. 3

| # OF ENHANCED ESF MESSAGE POSITIONS | # OF ENHANCED MESSAGES PER ESF CODE WORD | | | 10-OF-10 "LIKE" MESSAGES | TOTAL NUMBER OF DIFFERENT ENHANCED MESSAGES |
|---|---|---|---|---|---|
| | EW1 | EW2 | EW3 | | |
| 1 | 7 | – | – | 1 | 8 |
| 2 | 7 | 7 | – | 1 | 50 |
| 3 | 7 | 8 | 7 | 1 | 393 |

| MESSAGE OFFSET | "QL SEED" (7-OF-10 LIKE MESSAGES) | | | | | | | |
|---|---|---|---|---|---|---|---|---|
| | QL1 | QL2 | QL3 | QL4 | QL5 | QL6 | QL7 | QL8 |
| 0 | QL1 | QL2 | QL3 | QL4 | QL5 | QL6 | QL7 | QL8 |
| 1 | QL2 | QL3 | QL4 | QL5 | QL6 | QL7 | QL8 | QL1 |
| 2 | QL3 | QL4 | QL5 | QL6 | QL7 | QL8 | QL1 | QL2 |
| 3 | QL4 | QL5 | QL6 | QL7 | QL8 | QL1 | QL2 | QL3 |
| 4 | QL5 | QL6 | QL7 | QL8 | QL1 | QL2 | QL3 | QL4 |
| 5 | QL6 | QL7 | QL8 | QL1 | QL2 | QL3 | QL4 | QL5 |
| 6 | QL7 | QL8 | QL1 | QL2 | QL3 | QL4 | QL5 | QL6 |
| 7 | QL8 | QL1 | QL2 | QL3 | QL4 | QL5 | QL6 | QL7 |

| CONSECUTIVE "LIKE" MESSAGES | EQUIVALENT MESSAGE | OUTGOING SONET SSM FROM SONET NE |
|---|---|---|
| 10-OF-10 | NOT USING EITHER EAST OR WEST INPUT | WEST SSM = CONSECUTIVE SSM<br>EAST SSM = CONSECUTIVE SSM |
| 9-OF-10 | EAST INPUT USED | WEST SSM = CONSECUTIVE SSM<br>EAST SSM = DON'T USE |
| 8-OF-10 | WEST INPUT USED | WEST SSM = DON'T USE<br>EAST SSM = CONSECUTIVE SSM |

FIG. 10

| CONSECUTIVE "LIKE" MESSAGES | "UNLIKE" MESSAGE OFFSET | CONVEYED MESSAGE (BITS TO NE) | OUTGOING SONET SSM FROM SONET NE |
|---|---|---|---|
| 10-OF-10 | 0 | NOT USING EITHER EAST OR WEST INPUT | ALL PORTS = CONSECUTIVE SSM |
| 9-OF-10 | 1 | EAST INPUT 1 USED | EAST 1 SSM = DON'T USE<br>ALL OTHER PORTS = CONSECUTIVE SSM |
| 9-OF-10 | 2 | WEST INPUT 1 USED | WEST 1 SSM = DON'T USE<br>ALL OTHER PORTS = CONSECUTIVE SSM |
| 9-OF-10 | 3 | EAST INPUT 2 USED | EAST 2 SSM = DON'T USE<br>ALL OTHER PORTS = CONSECUTIVE SSM |
| 9-OF-10 | 4 | WEST INPUT 2 USED | WEST 2 SSM = DON'T USE<br>ALL OTHER PORTS = CONSECUTIVE SSM |
| 9-OF-10* | 5 | EAST INPUT 3 USED | EAST 3 SSM = DON'T USE<br>ALL OTHER PORTS = CONSECUTIVE SSM |
| 9-OF-10* | 6 | WEST INPUT 3 USED | WEST 3 SSM = DON'T USE<br>ALL OTHER PORTS = CONSECUTIVE SSM |

* FOR OPTIONAL SONET SOURCES (NOT SHOWN)

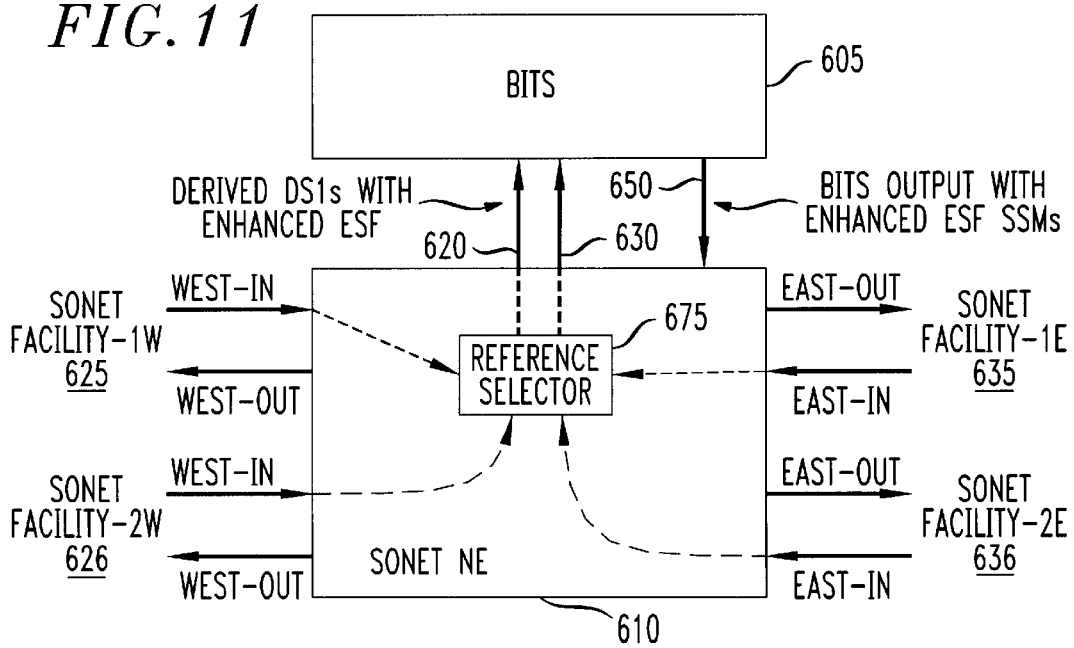

| PORT ASSIGNMENT TABLE | | |
|---|---|---|
| NE # | WEST INPUT | EAST INPUT |
| 1 | PORT 1 | PORT 2 |
| 2 | PORT 1 | PORT 2 |

FIG.16

| BITS ASSIGNMENT TABLE – EXAMPLE | | | | |
|---|---|---|---|---|
| NE LABEL | ACTIVE PORT | ACTIVE QL | PORT 1 QL | PORT 2 QL |
| 1 | 1 | QL1 | QL1 | QL7 |
| 2 | – | – | QL1 | QL7 |

ENHANCED SYNCHRONIZATION STATUS MESSAGING

CROSS-REFERENCE TO RELATED APPLICATION

This application claims the benefit of U. S. Provisional Application Ser. No. 60/068,878 filed on Dec. 26, 1997.

FIELD OF THE INVENTION

The invention relates generally to synchronous networks and, more particularly, to synchronization messaging schemes used in the management of synchronous networks.

BACKGROUND OF THE INVENTION

Synchronization status messaging is used to manage the distribution of timing in synchronous networks. In particular, synchronization status messages (SSMs) are used to convey clock quality information so that network elements within a synchronous network can select the most suitable synchronization reference available in the network. Importantly, network elements rely on SSMs to trigger synchronization reconfigurations during fault conditions and restorations and to prevent the creation of timing loops during these reconfigurations.

Synchronization status messages have been defined for both Synchronous Optical Network (SONET) signals as well as Digital Signal Level 1 (DS1) Extended Superframe (ESF) signals. For example, see American National Standards Institute (ANSI) T1X1.3 Technical Report No. 33 (TR33), "A Technical Report on Synchronization Network Management Using Synchronization Status Messages", April 1994 and Bellcore Generic Requirements (GR-253-CORE), "Synchronous Optical Network (SONET) Transport Systems: Common Generic Criteria", pages 5–48 to 5–91, Issue 2, December 1995, Revision 1, December 1997, both of which are herein incorporated by reference. In general, SSMs are bit-oriented messages sent in a repeating fashion via 4 bits in the S1 overhead byte in SONET signals and via code words in the ESF data link for DS1 signals. According to the aforementioned standards, a valid ESF SSM is declared if 7 out of 10 "like" messages are received, e.g., 7 code words indicating the same quality level for a synchronization reference.

Typically, network elements in a synchronous network have several sources that can be used as synchronization references, e.g., external timing, terminating line signals, or internal clock. The preferable mode in most synchronous networks is the Building Integrated Timing Supply (BITS) concept for synchronization distribution whereby synchronized network elements within the network receive timing externally from a master timing supply, referred to as a BITS clock. However, synchronization reconfigurations caused by fault conditions and restorations may require a network element to select another synchronization reference. At present, SSMs are only used to convey quality levels of synchronization references to facilitate these reconfigurations.

It has become apparent that the existing SSM scheme defined in the aforementioned standards has not kept pace with the evolving complexity and size of today's networks. Using SONET ring networks as an example, effective synchronization reconfigurations must take other factors into account besides the quality level of a synchronization references. For example, the direction of the timing supplied to a network element (e.g., east or west input signal being used to derive timing) or the number of available SONET timing sources may be important for the selection of a synchronization reference and for effectively preventing timing loops in the ring. This type of information is not transmitted by a network element to a BITS in the existing SSM scheme. Likewise, the identification of which network element's derived DS1 is being used by the BITS as the timing reference may be important for synchronization management. Again, this type of information is not transmitted by a BITS to a network element in the existing SSM scheme.

In sum, the existing SSM scheme is inadequate to provide the amount and type of information that is needed to effectively manage synchronization in today's synchronous networks.

SUMMARY OF THE INVENTION

An enhanced synchronization status messaging capability is provided according to the principles of the invention by supplying additional synchronization management information beyond that provided in existing synchronization messaging schemes but in a messaging format that is compatible with existing synchronization messaging standards. A plurality of additional messages, which are based on the same predefined code words used in existing synchronization status messages, are differentially coded and carried in available, but unused message positions in the existing messaging scheme.

In one illustrative embodiment, a two part message format is used for carrying information between network elements and between a network element and a co-located BITS clock in a synchronous network. A first part of the message format, referred herein as the standard message portion, carries the traditional quality level information of the synchronization references using the set of code words predefined in the applicable published standards. For example, the quality information of a synchronization reference is conveyed using 7 out of 10 "like" messages selected from the group of predefined code words set forth in the aforementioned standards. The second part of the message format, referred herein as the enhanced message portion, carries one or more enhanced messages that are conveyed using the same group of predefined code words as the standard message portion, but which are differentially coded into a plurality of message positions that are available and unused in the existing standard-compliant messaging schemes. For example, additional information is conveyed in the remaining 3 out of the 10 consecutive messages, which are presently transparent in the existing scheme. By differentially coding the enhanced message portion relative to the standard message portion, the enhanced message portion will always have separately identifiable code words even if the standard message portion changes, e.g., if the quality level designation of a reference conveyed by the 7 out of 10 "like" messages changes during a reconfiguration.

In addition to specifying the existing quality level designations for synchronization references using the standard message set, the enhanced synchronization status messages can be used to convey additional information, including, but not limited to: new quality level designations; reference, port and source designations; and node identification. The enhanced messaging scheme can also be used to carry out synchronization functions such as messaging for two-way time transfer and remote control to name a few.

BRIEF DESCRIPTION OF THE DRAWING

A more complete understanding of the present invention may be obtained from consideration of the following detailed description of the invention in conjunction with the drawing, with like elements referenced with like references, in which:

FIG. 1 shows the attributes of the synchronous status messages as defined in the existing synchronization messaging standards;

FIG. 2 is a functional representation of the enhanced messaging format according to the principles of the invention, FIG. 3 illustrates the possible combinations and number of enhanced messages that can be used according to the various exemplary embodiments of the present invention;

FIGS. 6–11 show illustrative examples of various SONET applications in which the principles of the invention may be practiced, whereby FIGS. 6, 8, 9, and 11 are simplified block diagrams of illustrative network configurations and FIGS. 7 and 10 are tables showing some exemplary messaging schemes that can be used for the illustrative network configurations according to the principles of the invention;

FIGS. 15–16 are tables showing examples of the type of configuration information that needs to be maintained for the network configuration shown in FIG. 14 according to the principles of the invention.

DETAILED DESCRIPTION OF THE INVENTION

Figures 4, 5:
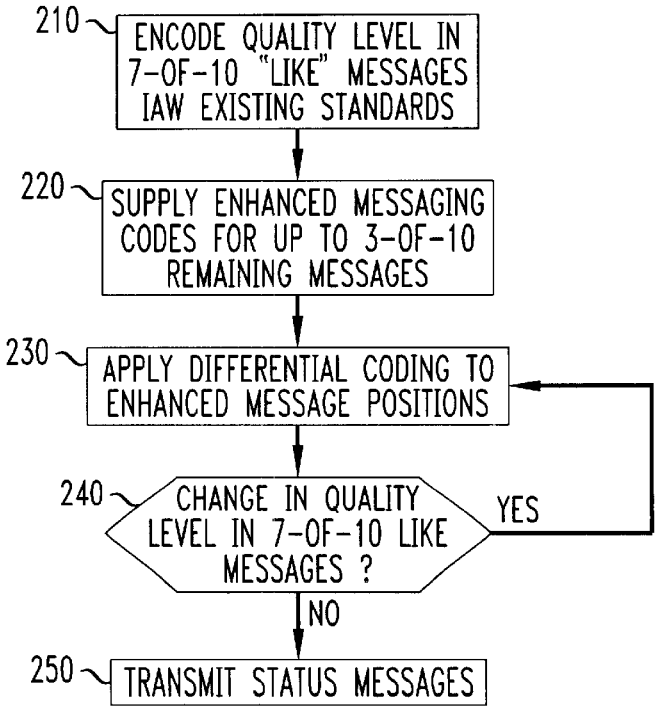
FIG. 4 shows an exemplary differential coding scheme according to the principles of the invention.
FIG. 5 is a flow diagram that shows the method steps associated with the messaging protocol according to the principles of the invention.

Although the illustrative embodiments described herein are particularly well-suited for a SONET-based synchronous network, and shall be described in this exemplary context, those skilled in the art will understand from the teachings herein that the principles of the invention may also be employed with other synchronous networks, including but not limited to Synchronous Digital Hierarchy (SDH) and DS1-based networks. Accordingly, the embodiments shown and described herein are only meant to be illustrative and not limiting.

As is well-known, SONET network elements typically receive reference timing from either a DS1 timing signal (e.g., from a Building Integrated Timing Supply (BITS)), an incoming Optical Carrier signal (e.g., OC-N signal), or the network element's internal clock. Synchronization status messages (SSMs) are used to facilitate the selection of appropriate synchronization references by the various network elements in the network. SSMs are bit-oriented messages that are communicated in a repeating fashion between network elements or between a BITS clock and one or more network elements to convey information about the quality levels of synchronization references. As previously stated, a valid ESF SSM is declared if 7 out of 10 "like" messages are received. Generally, equipment receiving timing signals with embedded SSMs will choose the signal with the highest quality level. If two signals have the same quality level, then a priority scheme is employed in the selection process.

In general, the bit-oriented SSMs are communicated between SONET network elements using SONET overhead and between a BITS clock and a SONET network element using code words in the Extended Superframe (ESF) data link in a DS1 signal. The bit-oriented SSMs which convey quality level of synchronization references are communicated between SONET network elements using 4 bits of the S1 overhead byte. As is well known, SSMs carried by the S1 byte in the SONET signals are typically translated into Extended Superframe (ESF) data link code words for transmission as ESF SSMs between a BITS and a network element. In particular, these ESF SSMs are typically carried in the derived DS1 that originates at the network element and which is supplied to the BITS, or is carried in the DS1 output provided by the BITS to a network element.

At present, the bit-oriented SSMs, whether S1 SSMs between network elements or ESF SSMs between the BITS and the network elements, are only used to convey quality levels of the synchronization references within the synchronous network. The aforementioned standards, ANSI TR-33 and GR-253-CORE, set forth the type and format of SSMs used in synchronous networks. In particular, there are eight unique SSMs defined in these aforementioned standards, wherein each of the SSMs represents a clock quality level for a synchronization reference. FIG. 1 shows the attributes of these eight SSMs. More specifically, the table in FIG. 1 includes a description of each quality level, its corresponding acronym, and the predefined code words used for conveying each quality level in either a DS1 or SONET signal. Using quality level 3 as an example, this quality level corresponds to a traceable Stratum 2 synchronization reference in the holdover mode. An SSM conveying this quality level transmitted via a DS1 ESF data link would have a code word of 00001100 11111111 while an SSM conveying this quality level transmitted via SONET overhead would populate bits 5 through 8 of the S1 byte with 0111, Use of the SSMs in accordance with the aforementioned standards is well-known and is only repeated here as background for understanding the enhanced messaging scheme of the present invention.

According to the principles of the invention, an enhanced synchronization status messaging scheme is provided for conveying additional synchronization status information beyond just the quality level information that is conveyed in existing synchronization status messages. An enhanced message format is needed to create a message frame for transferring this additional information. To maintain compatibility with existing systems complying with the aforementioned standards, the enhanced message format must also be able to convey the same quality level information which was conveyed using the prior messaging scheme. Accordingly, at least 7-of-10 "like" messages must still be transmitted using the code words for the predefined quality levels. The additional synchronization information may therefore be transmitted in the remaining 3-of-10 messages. Again, where compatibility with existing systems is a concern, the 3-of-10 messages used to convey the additional synchronization information would have to use the same predefined code words that are used to convey the quality levels. This approach minimizes the changes that may otherwise be required in the software and/or hardware of the systems.

FIG. 2 shows a simplified functional block diagram of the enhanced message format according to the principles of the invention. The 7-of-10 "like" messages, designated as blocks 110 and 115, are consecutive and are formatted as prescribed by the aforementioned standards, Messages 110 and 115 are therefore used to carry the same type of information about quality levels as before. The next 3-of-10 consecutive messages 120–122 comprise the enhanced messages which are used to convey the additional synchronization status information. Messages 120–122 are labeled as ESF code words $EW_1$, $EW_2$, and $EW_3$, respectively. As shown, the sample of 10 consecutive messages therefore includes the 7-of-10 messages 110 for conveying quality level and the 3-of-10 messages 120–122 for conveying additional information that can be used for various other synchronization management functions. To maintain compatibility between systems using the prior messaging scheme and those employing the enhanced messaging scheme of the present invention, the same ESF code words can be used for the 7-of-10 messages 110 and the 3-of-10 messages 120–122.

The table in FIG. 3 shows how the 3-of-10 messages $EW_1$, $EW_2$, and $EW_3$ can be used in various combinations to provide varying degrees of enhanced messaging capability. In general, the maximum number of messages that may be supported with the enhanced messaging scheme is dependent on the number of ESF code words used. In the examples that follow where less than all three $EW_1$, $EW_2$, and $EW_3$ code words are used, then it is assumed that the remaining code words would carry the same code word as the 7-of-10 "like" messages. For example, if only $EW_1$ is being used for enhanced messaging, then it is assumed that 9-of-10 "like" messages are being used for conveying quality level even though only 7-of-10 "like" messages are required to signify a valid SSM. Similarly, if only $EW_1$ and $EW_2$ are being used for enhanced messaging, then it is assumed that 8-of-10 "like" messages are being used for conveying quality level.

In the case where the number of enhanced ESF message positions is 1, i.e., where only $EW_1$ is used, then only seven additional or "enhanced" messages may be conveyed using the $EW_1$ code word. This is true because the same set of eight ESF code words (see FIG. 1) is being used to convey the 9-of-10 "like" messages as well as the $EW_1$ message, so the $EW_1$ message must use a different code word than is being used in the 9-of-10 "like" messages to convey quality level. For example, the 9-of-10 "like" messages will be using one of the eight ESF code words, which leaves the other seven ESF code words for use in $EW_1$. Consequently, the first seven additional or "enhanced" messages will be of a different ESF code word than the 9 of 10 "like" messages.

However, one additional "enhanced" message may be obtained by viewing the whole set of ten consecutive messages as a message in and of itself More specifically, if $EW_1$ is equal to the 9 of 10 "like" messages so that there are 10-of-10 "like" messages, then this result will yield one additional message, referred herein as a "+1" message. Accordingly, using one $EW_1$ will yield a total of eight enhanced message states. It should be noted that the examples described herein are for scenarios where it is assumed that backward compatibility is desired. As such, only the eight predefined 8-bit ESF code words are being considered although one skilled in the art will appreciate that an 8-bit code word itself can offer up to 256 different values, i.e., $2^8$.

In the case where the number of enhanced ESF message positions is 2, then each enhanced message position $EW_1$ and $EW_2$ can be used to convey seven additional or "enhanced" messages each for a total number of 49 additional or "enhanced" messages, i.e., 7×7. For the same reasons set forth above, these seven messages will have a different code word than the 8 of 10 "like" messages which are used in the case to convey quality levels. Again, a "+1" message may be obtained when both enhanced ESF message positions, $EW_1$ and $EW_2$, are equal to the remaining 8 of 10 "like" messages.

If all three enhanced ESF message positions are used, then $EW_1$ and $EW_3$ can each be used to convey 7 enhanced messages, while $EW_2$ can be used to convey 8 enhanced messages. By themselves, $EW_1$ and $EW_3$ can only support seven messages because of the pattern limitations previously described. For example, they cannot use the same code word as the 7-of-10 "like" messages since they are adjacent to the 7-of-10 "like" messages and the enhanced information would therefore not be recognized as a separate message from the 7-of-10 "like" messages. However, because $EW_2$ is between $EW_1$ and $EW_3$ and not adjacent to the 7-of-10 "like" messages, $EW_2$ can therefore use all eight of the predefined code words to convey eight separately identifiable enhanced messages. In combination, $EW_1$, $EW_2$ and $EW_3$ can convey 392 enhanced messages (7×8×7). With the "+1", message, the total number of enhanced messages thus becomes 393. Accordingly, depending on the order and type of the 3-of-10 consecutive messages, up to 393 new messages may be realized according to the principles of the invention.

Importantly, legacy equipment that uses the prior messaging scheme, e.g., ESF code words predefined in the aforementioned standards, will be able to accept the new enhanced message format. However, such equipment will only be able to extract the timing information (from the frequency content of the signal) and decode the quality level (from the 7-of-10 "like" ESF messages). Only newer equipment supporting the enhanced message decoder will have access to the new set of enhanced messages encoded in the $EW_1$, $EW_2$, and $EW_3$ code words.

According to another aspect of the invention, a differential coding scheme is provided for communicating the enhanced message format in a manner that is compatible with the existing synchronization status messaging standards, but which allows the enhanced messages to be separately identifiable from the 7-of-10 "like" messages. More specifically, the differential coding scheme is used to ensure that the 3-of-10 "enhanced" messages used to convey the enhanced synchronization status information can be differentiated from the 7-of-10 "like" messages used to convey the quality information according the existing synchronization status messaging standards.

The need for differential coding will be evident in view of the following example. In the case where a quality level 1 (QL1) message is being transmitted on a derived DS1, there should be at least 7-of-10 "like" ESF code words conveying the QL1 message. However, the enhanced message format according to the principles of the invention will use from one to three enhanced message positions ($EW_1$, $EW_2$, and/or $EW_3$). Assume the case where only one enhanced message position is used, $EW_1$, so that the quality level information of QL1 will actually be conveyed in 9-of-10 "like" messages. To avoid incompatibility issues, $EW_1$ needs to be one of the eight predefined code words set forth for ESF SSMs in the aforementioned standards. For this example, assume that the code word used for $EW_1$ is the same as the code word that would normally be used for a QL3 quality level. In a steady state condition, there will be nine consecutive QL1 code words followed by one QL3 code word. Now assume that the source clock enters a holdover condition where the quality level becomes QL3. If $EW_1$ remains the same, then there will now be ten consecutive QL3 messages. As a result, the enhanced message being carried by $EW_1$ will not be separately recognizable and therefore will be lost.

To accommodate these dynamic changes that may occur, a differential messaging scheme is proposed for the coding the enhanced message code words only. The premise of the scheme is to add an offset or series of offsets to a "seed" message, whereby the "seed" message is the quality level of the timing source, i.e., the message communicated by the 7-of-10 "like" messages. FIG. 4 shows one illustrative example of a predefined enhanced message framing pattern that can be used to support the differential coding according to the principles of the invention.

Using the table in FIG. 4, it will become apparent how the problem in the previous example is resolved. More specifically, the "seed" message in the above example would be the QL1 message. The original code word value for $EW_1$, which is the same as a QL3 code word, represents a message offset of "2" relative to the "seed" message of QL1. Now, when the source clock enters holdover and its quality level changes to QL3, the enhanced message offset remains "2". Therefore, the new differential message for $EW_1$ will change from a QL3 code word to a QL5 code word.

FIG. 5 shows a high level flow diagram illustrating the enhanced messaging scheme according to the principles of the invention. More specifically, the quality level of the synchronization reference is conveyed as shown in block 210 using 7-of-10 "like" messages as defined in the aforementioned standards. Enhanced messages are supplied as appropriate using any of the three remaining messages as shown in block 220. The enhanced messages are differentially coded, as shown in block 230, to ensure that the enhanced messages in any of the 3-of-10 message positions can be separately identifiable from the 7-of-10 "like" messages for quality level. As shown in block 250; the full set of 10-of-10 messages can be transmitted as appropriate among the elements in the network, wherein at least 7-of-10 messages are used for conveying quality level and wherein up to 3-of-10 messages are used for conveying additional synchronization status information. If there is a change in the quality level being communicated in the at least 7-of-10 "like" messages, as determined in block 240, then the code words representing the enhanced messages would be updated based on the offset value in the differential coding scheme.

In sum, the enhanced messaging capability provided by the present invention can be used to transmit many more and different types of SSMs as compare with the existing scheme which only provides for eight quality levels. A summary of some of the many different exemplary uses of the enhanced messaging capability according to the principles of the invention follows. In particular, enhanced SSMs can be used to convey new quality level designations for new clocks being proposed for use in synchronous networks. For example, since the time that the aforementioned TR33 and GR-253-CORE were issued, there have been new clocks proposed for use in the North American SONET network. Examples of these clocks include stratum 3E and G.812.

The enhanced messages may also be used for reference designations to identify which SONET network element is the source of timing being used by the BITS. In particular, some BITS clocks may terminate multiple derived DS1s from multiple SONET network elements. For this case, the BITS is unable to only communicate to the source network element that it receiving timing from. In fact, all SONET network elements that are receiving timing at the same quality level as the BITS will behave as if they are the source of the BITS timing. This behavior includes writing a "Don't Use for Synchronization" (DUS) message on the source optical port. By unnecessarily writing DUS messages, the timing path redundancy in the other (non-source) SONET rings is compromised. For example, only half of the total possible timing paths are available to network elements in those rings. If, however, the BITS was able to communicate which network element was the source of its timing (with a reference designation message), then only that network element would output a DUS message in the appropriate direction.

Yet another use of enhanced messages is for port designations for the network elements to communicate which optical port corresponds to the timing on each derived DS1 (e.g., east, west, primary, secondary, main, auxiliary, etc.). This is especially useful where SONET network elements can source their derived DS1 outputs from multiple optical sources. Similarly, enhanced messages can be used for source designations to designate the host as the master timing source in the case where a SONET ring includes network elements with equal stratum clocks. In such networks, transient conditions can exist that would create two sources of timing within the ring. When the frequency difference between these sources exceeds ±4.6 ppm, for example, the SONET payload integrity may be compromised. Therefore, a message may be needed to designate the host as the source of timing if equal stratum levels are present in the same ring. Enhanced messaging according to the principles of the invention can also be advantageously used for two-way time transfer to support measurement/correction actions to a BITS clock through the SONET infrastructure. Additionally, enhanced messaging can be used to convey performance status to synchronization sources. Reports could range from threshold crossing alarm indications to actual measurement values. Enhanced messaging also allows a SONET network element or a BITS to control each other. Such control functions could be related to operations, administration, maintenance, or provisioning. Enhanced messaging can also be advantageously used for node identification for addressing a single network element. With the ability to do remote provisioning, there will be a need to address a single network element. Therefore, each network element in a synchronization domain will need to have a unique identifier. This identifier could be a single message or an ordered group of designated ID messages.

FIGS. 6–11 show illustrative examples of various SONET timing applications in which the enhanced messaging scheme may be used. In each of these examples, a BITS clock is co-located with one or more SONET network elements. Moreover, each of these applications involve the transmission of an enhanced set of synchronization messages on the derived DS1 signals between the SONET network element and the BITS. It should be noted that these examples are meant to be illustrative and not limiting in any way.

Figures 6, 7:
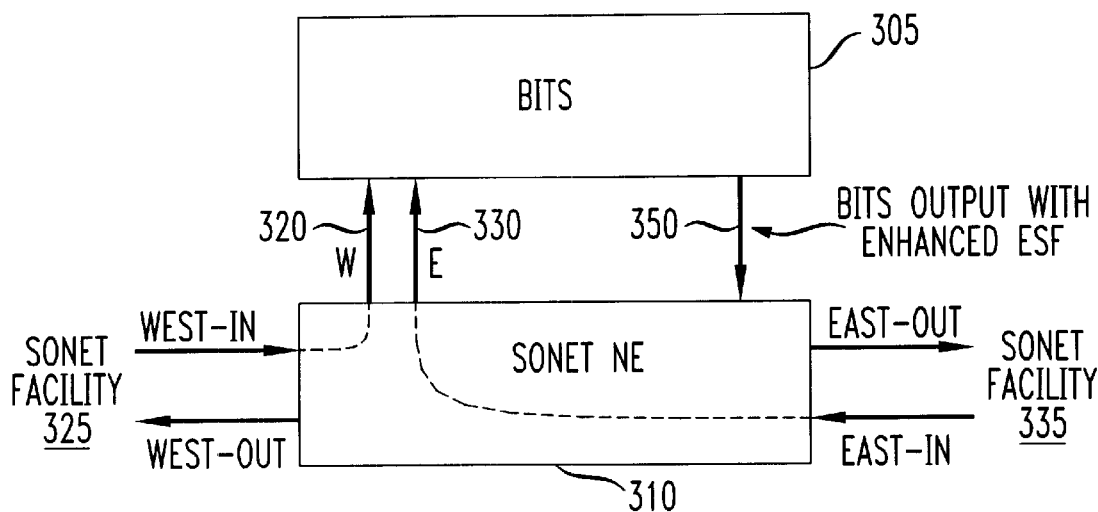

FIG. 6 shows a first exemplary SONET configuration including BITS 305 coupled to SONET network element 310. Network element 310 is coupled to SONET facility 325 via the west ports and to SONET facility 335 via the east ports. Network element 310 supplies BITS 305 with an input synchronization reference from the east direction via link 330 and with an input synchronization reference from the west direction via link 320. As shown, the inputs to BITS 305, which are the derived DS1 outputs from network element 310, are labeled as west (W) and east (E). As such, the west port of network element 310 supplies timing incoming from the west direction and the east port supplies timing incoming from the east direction. BITS 305 supplies an output signal to network element 310 via link 350. In this exemplary configuration, it is assumed that each BITS input/output port is physically assigned to a network element 310 so that SSMs transmitted by BITS 305 to network element 310 via link 350 are considered unique to network element 310.

In this example, SSMs supplied by network element 310 to BITS 305 via links 320 and 330 are assumed to be in accordance with the existing standards. That is, network element 310 would generate repeating messages, e.g., a minimum of 7-of-10 "like" ESF SSMs, that indicate the quality level for the synchronization references derived from the incoming east input from SONET facility 335 and from the incoming west input from SONET facility 325. Although not explicitly shown in this example, if network element 310 terminates multiple SONET sources or if multiple network elements are present, then multiple pairs of derived DS1s may be input to BITS 305.

The enhanced synchronization messages according to the principles of the invention are transmitted from BITS 305 to network element 310 Via link 350. The table in FIG. 7 shows one example of how enhanced messaging can be used communicate the input source selected by BITS 305. More specifically, the enhanced messaging is used to inform network element 310 whether BITS 305 is using either of the input synchronization references provided by network element 310 in derived. DS1 signals via links 320 or 330. More importantly, the enhanced messaging can be used to inform network element 310 whether network element 310 is supplying BITS 305 with an active input reference via links 320 or 330.

In response to the BITS output via link 350, network element 310 would generate the appropriate SSMs on its outgoing east and west links. As such, network element 310 must be able to read the enhanced messages, e.g., DS1 ESF code words, sent by BITS 305 and generate appropriate SSMs to SONET facilities 325 and 335 using the S1 byte, of the SONET overhead as previously described. In effect, the enhanced messaging scheme enables BITS 305 to control the outgoing SSMs being sent by network element 310.

It is assumed for this example that the consecutive messages that are being transmitted relate the quality level of the traceable timing reference. In the case of the one or more "unlike" messages, it may simply be any one of the other messages in the defined ESF code words for SSMs. The differential coding scheme will need to be used for the "unlike" messages as previously described.

Referring again to FIGS. 6 and 7, when network element 310 receives the enhanced SSMs from BITS 305 as set forth in columns 400 and 402 of FIG. 7, network element 310 will send outgoing messages as indicated in column 403. For example, if network element 310 receives 10-of-10 "like" messages from BITS 305, the equivalent message using the enhanced messaging scheme would be that BITS 305 is not using either the east or west input source to network element 310. As such, network element 310 would in turn continue sending consecutive SSMs in the west-out and east-out directions indicating a valid source of timing in either direction, In the case where network element 310 receives 9-of-10 "like" messages from BITS 305, the equivalent message using the enhanced messaging scheme would be that BITS 305 is using the east input source to network element 310. As such, network element 310 would in turn continue sending consecutive SSMs in the west-out direction. However, network element 310 would send a "Don't Use for Synchronization" (DUS) message in the east-out direction since the east-in port is the active timing source. The case of using 8-of-10 "like" messages is similar to the preceding case and will not be repeated here for sake of brevity.

Figure 8:
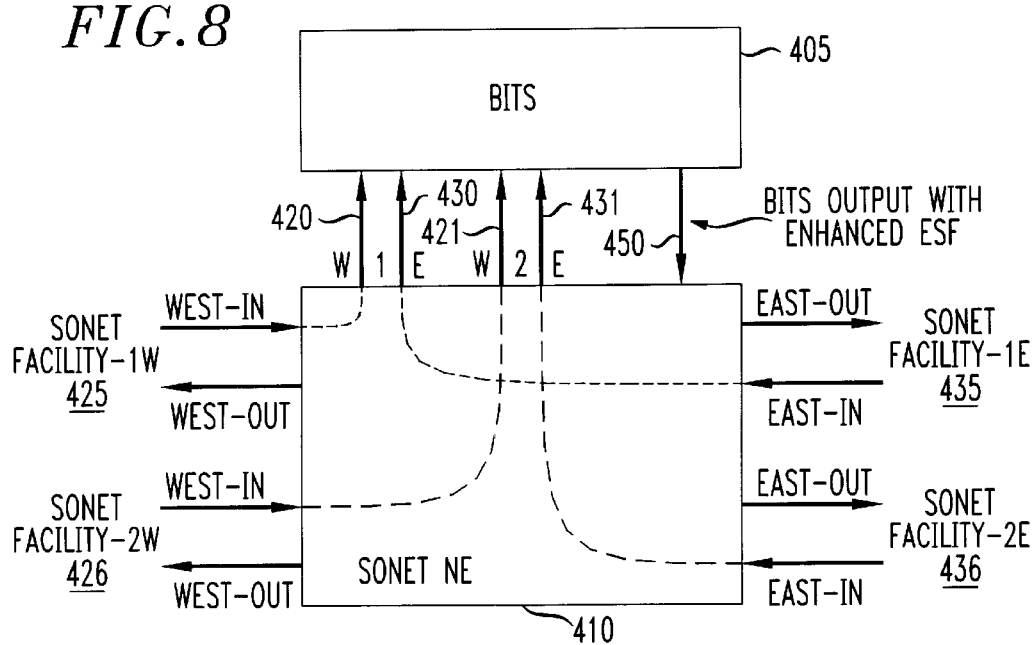

FIG. 8 shows another exemplary SONET configuration in which network element 410 is supplying two separate pairs of derived DS1 outputs to BITS 405 representing four separate SONET sources. Each of these sources is timed from a traceable timing reference and terminates on the network element 410. The enhanced messaging scheme used for this configuration is similar to that described in the preceding embodiment, except for the type and order of the "unlike" messages used for conveying the enhanced synchronization information.

More specifically, network element 410 is coupled to SONET facility-1W 425 and to SONET facility-2W 426 and to SONET facility-1E 435 and to SONET facility-2E 436. Network element 410 supplies BITS 405 with an input synchronization reference from facility-1E 435 via link 430, an input synchronization reference from the facility-1W 425 via link 420, an input synchronization reference from facility-2E 436 via link 431, and an input synchronization reference from the facility-2W 426 via link 421. As shown, the inputs to BITS 405, which are the derived DS1 outputs from network element 410, are labeled as 1W, 1E, 2W, and 2E. Network element 410 supplies timing incoming from the respective east and west facilities and BITS 405 supplies an output signal to network element 410 via link 450 in a similar manner as previously described for the configuration in FIG. 6.

Figure 9:
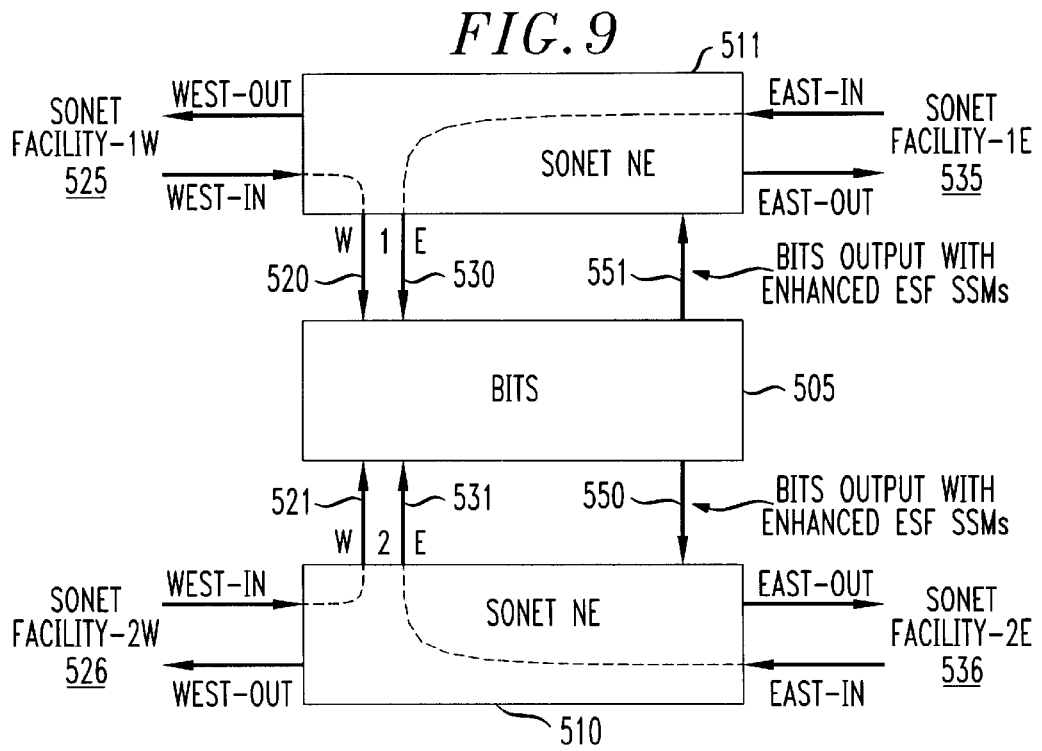

FIG. 9 shows another exemplary SONET configuration whereby multiple timing references are supplied to BITS 505 from two separate network elements 510 and 511. Both network elements are co-located with BITS 505 and each terminates separate SONET links. All other connectivity aspects of the configuration shown in FIG. 9 are similar to that previously described for FIG. 8 and will not be repeated here for sake of brevity. For ease of illustration and description, the reference numerals for elements in FIG. 9 correspond on a one-to-one basis with similar elements in FIG. 8, except that the first digit of reference numerals in FIG. 8 is "4" while the first digit of reference numerals in FIG. 9 is "5". For example, BITS 405 in FIG. 8 and BITS 505 in FIG. 9. The other notable exception is the addition of network element 511 in FIG. 9.

In one exemplary embodiment of the enhanced messaging scheme as applied to the configurations shown in FIGS. 8 and 9, BITS 405 (FIG. 8) and BITS 505 (FIG. 9) can communicate the choice of message, e.g., enhanced message, to the respective network elements by using 1-of-10 "unlike" messages transmitted on a continuous basis. This scheme is shown in the table in FIG. 10. Moreover, it should be noted that BITS 405 or BITS 505 would broadcast the same message on all outputs to the respective network elements in this example.

Referring to FIG. 10, the column with the heading "conveyed message (BITS to NE)" provides an example of the types of messages that could be transmitted according to the principles of the invention previously described. Furthermore, the column with the heading "outgoing SONET SSM from SONET NE" provides an example of the types of corresponding messages that could be transmitted from the respective network elements to the respectively connected SONET facilities. Importantly, by using the enhanced messaging scheme to inform the respective network elements of which timing source is the active source, the transmission of unnecessary DUS messages is reduced thereby improving synchronization distribution within the network. In particular, this scheme provides a more efficient way of preventing unnecessary timing loops.

It should be noted that other information, such as information regarding other quality levels, port identifiers, or other SSM-related information, could also be sent with these messages using the enhanced messaging scheme of the present invention.

The enhanced messaging scheme according to the principles of the invention can be expanded to address many other different network configurations which are not shown. For example, by setting up the enhanced messaging scheme to accommodate up to 50 additional enhanced synchronization status messages in a manner that was previously described (e.g., using 2-of-10 "unlike" messages), SSM status can be communicated for up to 49 SONET facilities. Similarly, by using all 3-of-10 "unlike" messages for communicating additional "enhanced" messages, the present invention can support SSM messaging for up to 391 SONET facilities.

According to another aspect of the invention, the enhanced messaging scheme allows for integrated control and switching of synchronization messaging and sources between a BITS and a network element. In this scheme, the network element communicates the quality level of all possible input references to the BITS via an enhanced set of SSMs, including the SSM of the active reference. The quality level of the current reference is encoded with the current ESF scheme. This assumes that the network element is capable of switching multiple SONET references to a pair of derived DS1 s. The derived DS1 s may be either traceable to the same or different sources (e.g. east or west). This eliminates the need for multiple (parallel) derived DS1 pairs from a single network element.

In this scenario, the BITS will use the SSM information from the network element or elements and make a selection based on a pre-optioned scheme (e.g., priority, quality level). Once the BITS makes its reference selection, it outputs it choice in the enhanced SSM format to the network element. The BITS also outputs it present quality level that is independent of its input choice. For example, the BITS could be in a holdover mode while it signals to the network element to change its SONET reference. Once the network element receives the input reference choice of the BITS, it will switch to this reference and stay there until signaled by the BITS to change.

Referring to FIG. 11, BITS 605 is coupled to SONET network element 610. Network element 610 is coupled to SONET facility-1W 625 and to SONET facility-2W 626 and to SONET facility-1E 635 and to SONET facility-2E 636. Network element 610 further includes reference selector 675 which supplies BITS 605 with input synchronization references from any of the connected SONET facilities. It is important to note that the outputs 620 and 630 from reference selector 675 are derived DS1s with enhanced SSM messages and output 650 from BITS 605 to network element 610 includes enhanced SSM messages according to the principles of the invention.

In operation, network element 610 selects a timing reference using reference selector 675 based on a quality level/priority scheme. This decision may be eventually overridden by BITS 605. In order to communicate this choice to BITS 605, network element 610 uses a combination of signaling schemes. More specifically, network element 610 communicates the quality level of the source by using the 7-of-10 "like" ESF messages according to the aforementioned TR-33 and GR-253-CORE standards. Network element 610 communicates the port or optical source of the selected reference by using the enhanced messaging scheme according to the principles of the invention. In this example, the enhanced messaging scheme would include sending information using 3-of-10 consecutive "like" messages. Each group of the 3-of-10 "like" messages constitutes a word and groups of words are assembled to form a frame. Frames are then sent on a regular, repeating basis. One exemplary format for these frames sent from network element 610 to BITS 605 is shown in FIG. 12.

Figure 12:
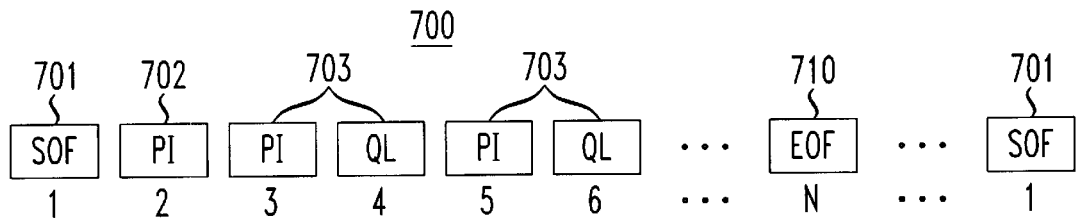
FIG. 12 shows an exemplary frame format that may be used for communication from a network element to a BITS according to the principles of the invention.

Referring to FIG. 12, each frame begins with a SOF (start of frame) word 701 and ends with an EOF (end of frame) word 710. The next word in the frame after SOF 701 is the PI (port identifier) word 702, which identifies the port on network element 610 that is currently being used as a timing reference. The quality level of this port is communicated via 7-of-10 "like" messages in the ESF data link as previously described. Each subsequent pair of words 703 indicates the port identifier and the quality level of a port that is not currently being used. Depending on the desired type of information, more words may be used.

Figure 13:
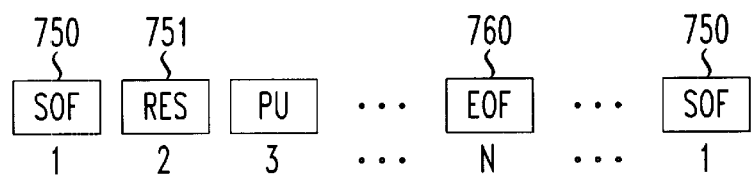
FIG. 13 shows an exemplary frame format that may be used for communication from a BITS to a network element according to the principles of the invention.

Once BITS 605 receives this information, it decides if any of ports on network element 610 are suitable for timing. In order for BITS 605 to communicate its reference choice to network element 610 via link 650, a frame format such as that shown in FIG. 13 is required. As shown, the frame format for the BITS output message (FIG. 13) is different from the frame format for the BITS input message (from network element 610) shown in FIG. 12.

Referring to FIG. 13, each word is composed of 3 consecutive ESF code words. The quality level of the BITS timing reference is communicated via the 7-of-10 "like" messages. The SOF words 750 and EOF word 760 represent the start and end of the frame. The PU word represents a "port used" word that can be used by BITS 605 to communicate to network element 610 which port is being used by BITS 605 as the synchronization reference source. The RES word 751 represents the reservation word, which BITS 605 populates to cause network element 610 to select the desired reference. The RES word 751 can contain the value of a specific port that network element 610 terminates or may contain a "not using port" (NSP) identifier. If network element 610 receives the NUP identifier in RES word 751, it will output the 7-of-10 quality level messages on all outgoing SONET ports. If, however, a specific port is contained in RES word 751, then network element 610 outputs the DUS message on that SONET port. All SONET messaging is accomplished via the S1 nibble (i.e., bits 5–8) in the SONET overhead. If RES word 751 contains a specific port identifier, then network element 610 will select this port as a reference and send this to BITS 605 via the derived DS1, e.g., DS1 620 or 630. This reference may be selected for both derived DS1s or on an individual basis. If selected on an individual basis, it allows BITS 605 to have a pair of references that follow a different SONET path, thus ensuring that the timing sources follow a separate and diverse route.

Since information that the BITS receives is network element-specific, the BITS will need to maintain an assignment table to define the mappings between the specific BITS input and output ports and each network element. This assignment table will keep track of various attributes of each synchronization source. An exemplary network configuration and associated assignment tables are shown in FIGS. 14–16.

Figure 14:
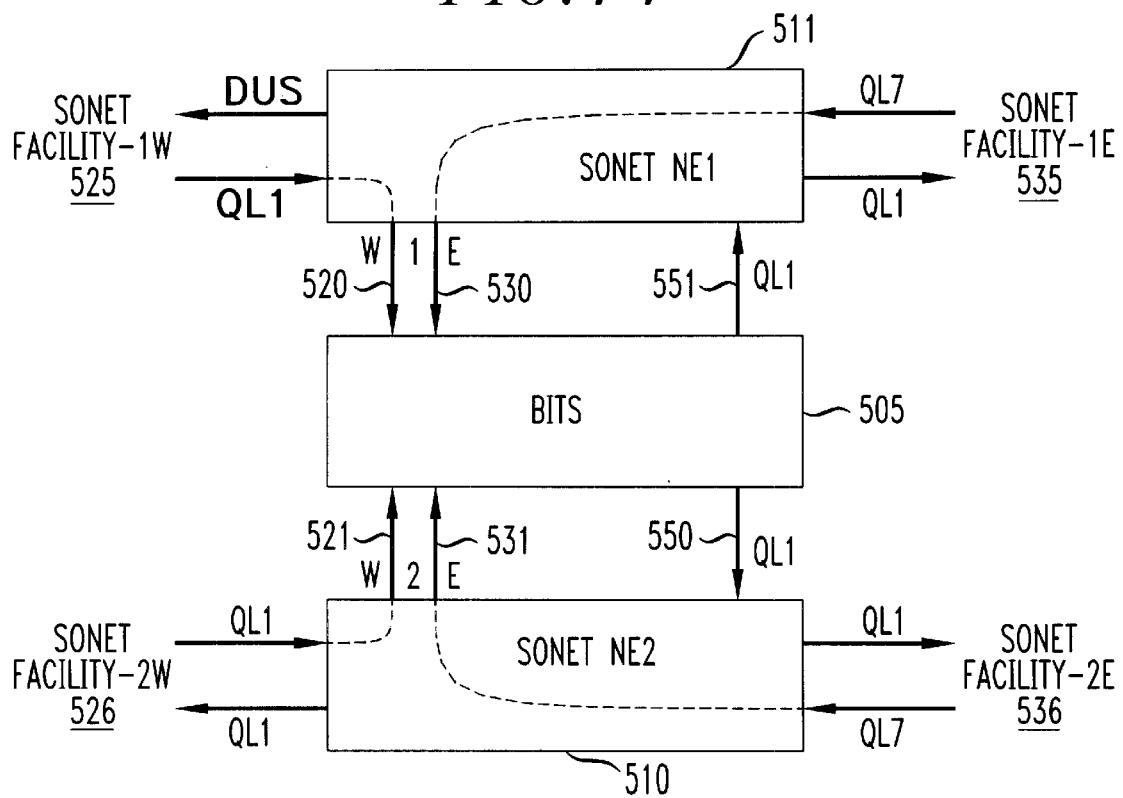
FIG. 14 is a simplified block diagram of an exemplary network configuration illustrating the flow of synchronization signals and messages according to the principles of the invention.

FIG. 14 shows the same configuration as previously shown and described in FIG. 9 except that the quality levels of the various synchronization references have been added to the respective signal paths. As shown, network element 510 is receiving a QL7 timing reference from SONET facility-2E 536 on the eastern input and a QL1 timing reference from SONET facility-2W 526 on the western input. Similarly, network element 511 is receiving a QL7 timing reference from SONET facility-1E 535 on the eastern input and a QL1 timing reference from SONET facility-1W 525 on the western input. These quality levels are communicated to BITS 505 as previously described using the 7-of-10 "like" messages according to the aforementioned standards. The tables in FIGS. 15–16 show how BITS 505 maintains information on the source of the various timing references to facilitate the appropriate selection and subsequent messaging.

FIG. 15 shows the port assignment table maintained by BITS 505 which labels the ports corresponding to each input for each connected network elements. FIG. 16 shows the BITS assignment table which identifies 1) the active port of the network element supplying the timing reference used by the BITS; 2) the quality level of the timing reference being used by the BITS, and 3) the quality level of the timing references supplied on each port of the respective network elements. For example, BITS 505 is using the timing reference supplied by network element 511 (NE1) on port 1, thus making port 1 on NE1 the "active port". The quality level of this active timing reference is a QL1, thus making the "Active QL" a QL1. The Port 1 QL for NE1 is QL1 and the Port 2 QL is QL7, which indicates that NE1 is receiving a QL1 timing reference on Port 1 (West Input) and a QL7 timing reference on Port 2. Similarly, the Port 1 and Port 2 QL's reflect the same information for NE2. However, since BITS 505 is not using a timing reference supplied by NE2, the Active Port and Active QL entries for NE2 are therefore empty.

These foregoing exemplary SONET applications illustrate some of the capabilities provided by the enhanced synchronization status messaging scheme according to the principles of the invention. As shown and described, the enhanced messaging scheme offers important advantages, such as being able to communicate source traceability of an OC-N signal, thus allowing the DUS message to accurately reflect a source timing route. Enhanced messaging also supports greater switching flexibility at nodes that contain a BITS and multiple network element sources, such as allowing the BITS to select a single source of timing from all possible sources that terminate on one or multiple SONET network elements.

The enhanced messaging scheme shown and described herein has been primarily in the context of synchronization status messaging that occurs in the DS1 ESF signals exchanged between a SONET network element and a BITS clock. However, these embodiments are meant to be illustrative and not limiting. According to another aspect of the invention, the enhanced synchronization status messaging can be implemented between network elements in a SONET (or SDH) network. As stated, SONET networks are evolving in size and complexity which require more efficient synchronization management. One example of the type of network architecture that presents a problem for synchronization management is the SONET virtual ring architecture. As such, there is an increasing need for more S1 byte synchronization status messages to provide enhanced synchronization information between SONET network elements. As described for the ESF data link, the enhanced status messaging in the S1 byte can provide capabilities including, but not limited to: adding more quality levels; providing reference, port, and source designations; providing messaging for two-way time transfer; providing remote control functions; and providing node identification, to name a few.

Presently, the S1 byte of SONET overhead is used to transport one of the eight possible SSMs defined in the aforementioned standards. SSMs are typically sent in a repeating fashion in SONET frames (e.g., 125 µsec frames) at a rate of 8000 times a second. In order for the message to be recognized by a SONET network element, it must be present in 8 consecutive samples. Because only four bits of the S1 byte are used to carry the SSMs, the bandwidth that is reserved to carry one of eight repeating SSMs is therefore 32 kbps. Stated otherwise, 32 kbps is allocated to send only one of eight repeating messages. This clearly appears to be a very inefficient use of bandwidth in the SONET Overhead. A more efficient use of the 32 kbps of bandwidth can be achieved by transmitting not only the existing quality level SSMs, but also additional synchronization information as set forth in the preceding discussion. Accordingly, the principles of the invention can be used to more efficiently use the 32 kbps data transport capability of the S1 byte.

More specifically, by modifying the S1 byte messaging scheme used between SONET network elements, the 32 kbps bandwidth allocated to the S1 byte can be effectively used as a data communication channel for communicating the additional messaging information between the two SONET network elements. For example, the redefined protocol for processing the S1 byte can be a 32 kbps serial bit stream with framing, e.g., with the bit stream formatted as a subrate DS0 signal. It should be noted that various suitable framing patterns and useful message formats carried in the redefined data communication channel will be apparent to those skilled in the art.

Consequently, the more important aspect is that an alternative protocol definition of the S1 byte will accommodate the enhanced messaging according to the principles of the invention. It should also be noted that redefining only the S1 byte processing will not otherwise disrupt the normal SONET signal processing because S1 byte information is only transported on a point-to-point basis, that is, between two network elements. Because SONET (or SDH) synchronization messaging is based on a point-to-point protocol, the enhanced messaging could be therefore be provisioned on a per-port basis.

One illustrative application in which the enhanced S1 byte SSMs may be used is SONET synchronization for a local area network (LAN) implementation, More specifically, the modified S1 byte messaging scheme may be used to provide a synchronization data link. This data link may be used to support many different services such as, for example, the ability to manage the synchronization functions of a synchronization domain from a central point. For purposes of this discussion, a synchronization domain is the sum of all network elements that are traceable to a timing master, e.g., a stratum 1 or PRS master. Examples of management functions that could be carried out using the enhanced scheme could include provisioning of timing paths between network elements, viewing active and standby synchronization paths in real time, fault detection of the synchronization path, and performance monitoring of synchronization parameters of all network elements.

The foregoing is merely illustrative of the principles of the invention. Those skilled in the art will be able to devise numerous arrangements, which, although not explicitly shown or described herein, nevertheless embody those principles that are within the spirit and scope of the invention. For example, in the case where compatibility with systems using the existing messaging standards is not a concern, then new code words can be defined to convey a greater number of enhanced messages. More specifically, instead of just choosing from among the eight predefined code words set forth in the TR33 and GR-253-CORE standard, each 8-bit code word can actually provide up to 256 different messages, i.e., $2^8$. Of course, additional changes to hardware and/or software may be required to support the coding and processing of the newly defined code words. Accordingly, the scope of the invention is limited only by the claims that follow.

What is claimed is:

1. A method of providing enhanced synchronization status messaging in a synchronous network of the type wherein synchronization status is transmitted using a predetermined number of messages, and wherein a selected number of the predetermined number of messages is used for carrying a first type of status information in accordance with a predefined standard, the first type of status information being indicative of a quality level of a synchronization reference, the method comprising:

providing a second type of status information using at least one of the remaining number of the predetermined number of messages, wherein the second type of status information is indicatve of additional synchronization-related information other than the quality level; and selecting the synchronization reference as a timing source based on at least one of the first and second type of status information contained in the predetermined number of messages.

2. The method of claim 1, wherein the first type of status information is communicated using a consecutive number of like messages in accordance with the predefined standard.

3. The method of claim 2, further comprising the step of differentially coding messages associated with the second type of status information relative to the messages carrying the first type of status information.

4. The method of claim 3, wherein the step of differentially coding includes the steps of:

establishing a seed value based on the messages carrying the first type of status information; and deriving the messages for carrying the second type of status information based on an offset from the seed value.

5. The method of claim 4, wherein the differentially coded messages carrying the second type of status information are updated as a function of a change in the messages carrying the first type of status information.

6. The method of claim 2, wherein the predetermined number of messages is 10 and wherein the consecutive number of like messages is at least 7 out of 10 messages.

7. The method of claim 6, wherein the remaining number of the predetermined number of messages for conveying the second type of status information is selected from the group consisting of 1 out of 10 messages, 2 out of 10 messages, and 3 out of 10 messages.

8. The method of claim 2, wherein the messages are bit-oriented messages sent in a repeating fashion between selected elements in the synchronous network.

9. The method of claim 8, wherein the bit-oriented messages are carried in selected bits of a selected overhead byte of a SONET-formatted signal.

10. The method of claim 9, wherein the first and second type of status information are communicated between a plurality of network elements.

11. The method of claim 8, wherein the bit-oriented messages are code words carried in an extended superframe data link of a digital signal.

12. The method of claim 11, wherein the digital signal is a DS1 signal format.

13. The method of claim 11, wherein the code words used to convey both the first and second type of status information are selected from a same set of predefined code words.

14. The method of claim 13, wherein each of the predefined code words is associated with a particular quality level set forth in the predefined standard.

15. The method of claim 1, wherein the first type of status information is communicated between a building integrated timing supply and at least one network element.

16. The method of claim 15, wherein the building integrated timing supply is coupled to a plurality of network elements, wherein at least one of the plurality of network elements is capable of receiving and is responsive to only the first type of status information and wherein at least another one of the plurality of network elements is capable of receiving and is responsive to both the first and second type of status information.

17. The method of claim 1, wherein the second type of status information is communicated from a building integrated timing supply to at least one network element connected thereto.

18. The method of claim 1, wherein the second type of status information is communicated from a building integrated timing supply to at least one network element connected thereto and from the at least one network element to the building integrated timing supply.

19. The method of claim 15, wherein the second type of status information comprises information selected from the group consisting of quality level information, reference designation information for designating a particular network element supplying timing being used by the building integrated timing supply, and port designation information for identifying a particular port on a particular network element associated with a timing source.

20. The method of claim 15, wherein the second type of status information is used for carrying out a selected synchronization function.

21. A method of providing enhanced synchronization status messaging in a synchronous network of the type wherein synchronization status is transmitted between elements in the synchronous network using a predetermined number of messages, the method comprising:

providing a first type of synchronization status indicative of a quality level of a synchronization reference, the first type of synchronization status being communicated using a selected number of consecutive like messages; and providing at least a second type of synchronization status indicative of additional synchronization-related information other than the quality level, the second type of synchronization status being communicated using at least one unused message of the predetermined number of messages.

22. The method of claim 21, further comprising the step of differentially coding the messages associated with the second type of synchronization status relative to the messages carrying the first type of synchronization status.

23. The method of claim 22, wherein the step of differentially coding includes the steps of:

establishing a seed value based on the messages carrying the first type of synchronization status; and deriving the messages for carrying the second type of synchronization status based on an offset from the seed value.

24. The method of claim 23, wherein the differentially coded messages carrying the second type of synchronization status are updated as a function of a change in the messages carrying the first type of synchronization status.

25. The method of claim 21, wherein the predetermined number of messages is 10 and wherein the selected number of consecutive like, messages is at least 7 out of 10 messages.

26. The method of claim 25, wherein the second type of synchronization status is conveyed using a number of unused messages selected from the group consisting of 1 out of 10 unused messages, 2 out of 10 unused messages, and 3 out of 10 unused messages.

27. The method of claim 21, wherein the messages are bit-oriented messages sent in a repeating fashion between selected elements in the synchronous network.

28. The method of claim 27, wherein the bit-oriented messages are carried in selected bits of a selected overhead byte of a SONET-formatted signal.

29. The method of claim 28, wherein the first and second type of synchronization status are communicated between a plurality of network elements.

30. The method of claim 27, wherein the bit-oriented messages are code words carried in an extended superframe data link of a digital signal.

31. The method of claim 30, wherein the digital signal is a DS1 signal format.

32. The method of claim 30, wherein the code words used to convey both the first and second type of synchronization status are selected from a same set of predefined code words.

33. The method of claim 21, wherein the first type of synchronization status is communicated between a building integrated timing supply and at least one network element.

34. The method of claim 21, wherein the second type of synchronization status is communicated from a building integrated timing supply to at least one network element connected thereto.

35. The method of claim 21, wherein the second type of synchronization status is communicated from a building integrated timing supply to at least one network element connected thereto and from the at least one network element to the building integrated timing supply.

36. A system for providing enhanced synchronization status messaging in a synchronous network of the type wherein synchronization status is transmitted using a predetermined number of messages, the system comprising:

means for providing a first type of synchronization status indicative of a quality level of a synchronization reference and for communicating the first type of synchronization status using a selected number of consecutive like messages; and means for providing at least a second type of synchronization status indicative of additional synchronization-related information other than the quality level and for communicating the second type of synchronization status using at least one unused message of the predetermined number of messages.

37. The system of claim 36, wherein the synchronous network includes a building integrated timing supply and at least one network element connected thereto, and wherein the first type of synchronization status is communicated between the building integrated timing supply and the at least one network element.

38. The system of claim 37, wherein the building integrated timing supply is coupled to a plurality of network elements, wherein at least one of the plurality of network elements is capable of receiving and is responsive to only the first type of synchronization status and wherein at least another one of the plurality of network elements is capable of receiving and is responsive to both the first and second type of synchronization status.

39. The system of claim 36, wherein the synchronous network includes a building integrated timing supply and at least one network element connected thereto, and wherein the second type of synchronization status is communicated from the building integrated timing supply to the at least one network element connected thereto.

40. The system of claim 36, wherein the synchronous network includes a building integrated timing supply and at least one network element connected thereto, and wherein the second type of synchronization status is communicated from the building integrated timing supply to the at least one network element connected thereto and from the at least one network element to the building integrated timing supply.

* * * * *